Oct. 13, 1931.  J. C. M. MASSEY  1,827,397
MOTOR VEHICLE
Filed June 9, 1927    2 Sheets-Sheet 1
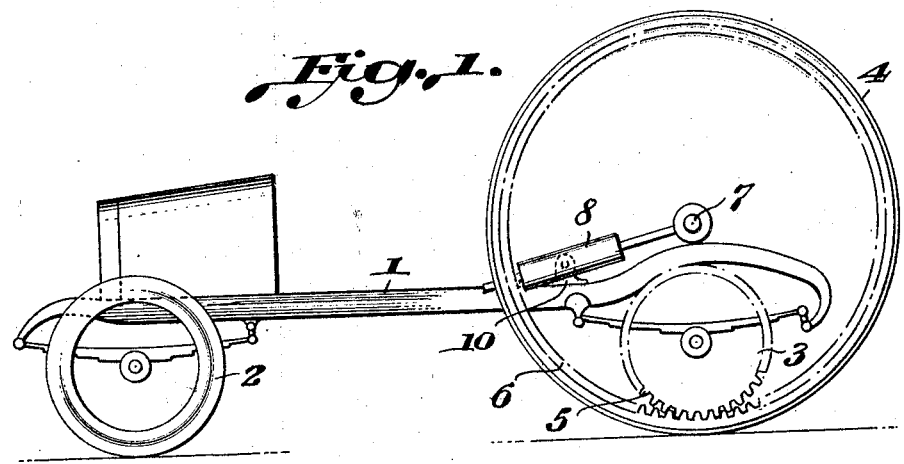
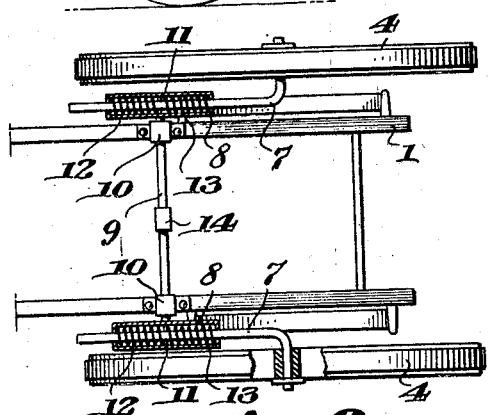
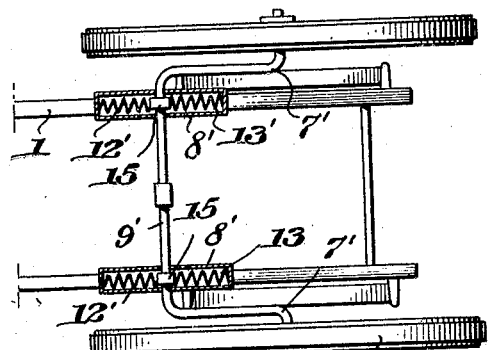
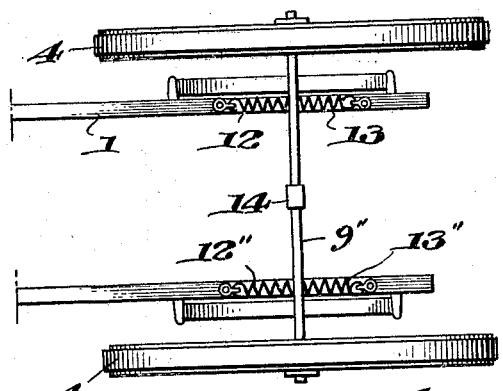
Inventor:
Juan Carlos Molina Massey,
By Emil Bönnelycke
Atty.

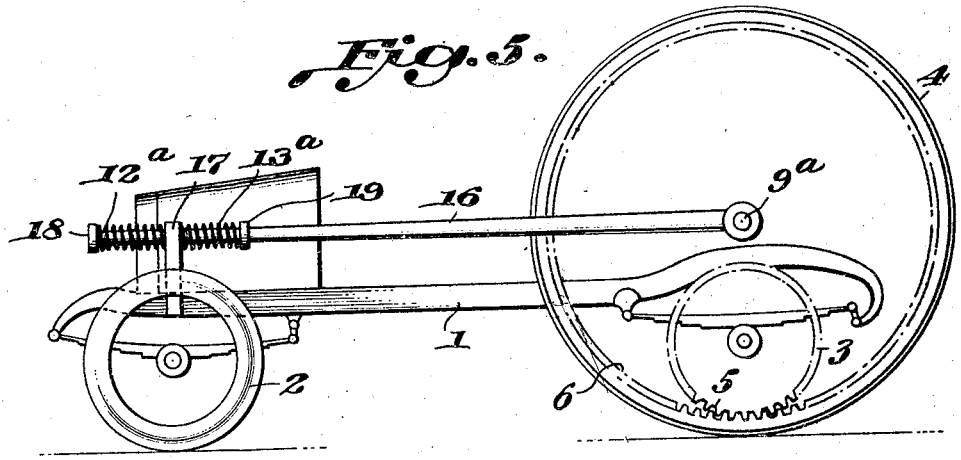
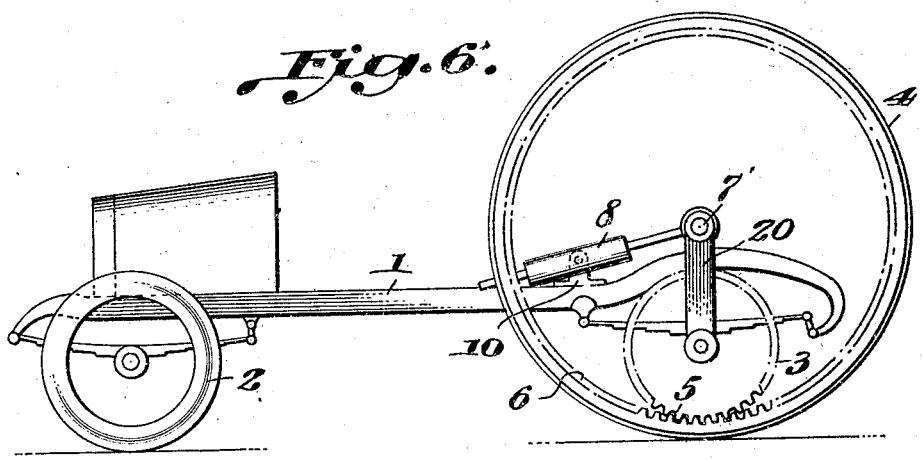
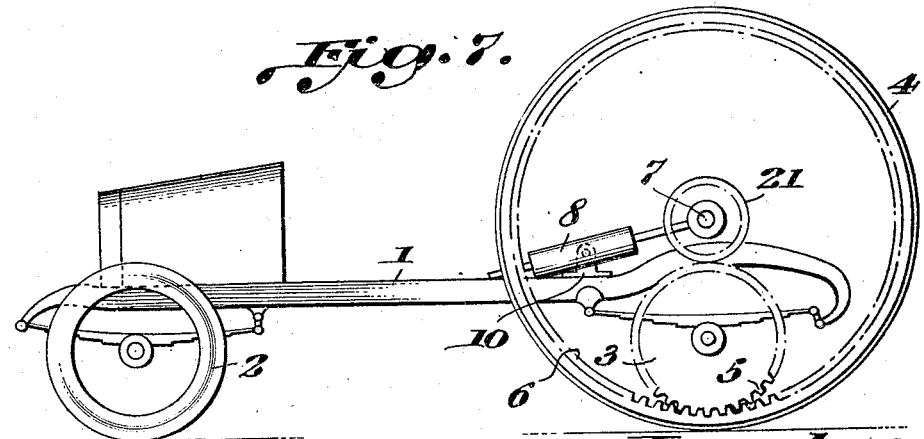

Patented Oct. 13, 1931

1,827,397

UNITED STATES PATENT OFFICE

JUAN CARLOS MOLINA MASSEY, OF ADROGUE, ARGENTINA

MOTOR VEHICLE

Application filed June 9, 1927. Serial No. 197,728.

My present invention relates to certain improvements in motor vehicles of the type in which the driving wheels contact with the inside of and drive a circular rail, its object being to provide means for supporting and guiding said circular rail with respect to the frame of the vehicle and also with respect to the driving wheels.

The invention has other objects in view which will be clearly understood from the following description and which are clearly set forth in the appended claims.

In order that my present invention be clearly understood and easily carried into practice some preferred embodiments thereof have been shown in the appended drawings wherein, Figure 1 is a side view of an embodiment of the invention.

Figure 2 is a plan view of a portion thereof.

Figure 3 is a plan view of a modified form of the invention.

Figure 4 shows a plan view of a still further modification.

Figure 5 is a side view of another embodiment.

Figure 6 is a side view of an embodiment showing a novel link connection between the axles of the driving wheel and the circular rail, and Figure 7 is a side view of an embodiment showing a connection between the driving wheels and the circular rails.

Similar characters of reference denote same or like parts throughout the said drawings.

In the embodiment shown in Figs. 1 and 2, 1 is the frame of the vehicle, 2 the front wheels and 3 the driving wheels, said wheels which are yieldably connected to the frame having outer teeth 5 which mesh with the inner teeth 6 of a circular rail 4.

The main feature of my present invention consists in the manner in which the circular rail 4 is articulated with the frame of the vehicle, which allows a relative displacement upwardly, forwardly, rearwardly and downwardly of the circular rail with respect to the frame.

According to my present invention each of the circular rails 4 is rotatably mounted on a spindle extending outwardly from one end of an arm 7, which, as may be seen from Figure 2, slides within a bushing 8 which is mounted at a respective end of an axle 9, in turn, mounted for rotation in bearings 10 which are mounted upon the frame of the vehicle. The arm 7 has an abutment 11 thereon intermediate its ends, and relatively adjacent ends of the springs 12 and 13 bear against it and the other ends bear against the ends of the bushing so that the movements of the arms and the circular rails mounted thereon are independent and cushioned by the action of the said springs.

In the embodiment of the invention shown in Figure 3, the arms 7' are made integral with each other and with the transverse axle 9' and the bearings 15, for the axle, are mounted within the bushings 8' between the springs 12' and 13', so that they may slide in longitudinal slots (not shown) in the bushings therein and be cushioned in such movement.

In the embodiment illustrated in Figure 4, the circular rails are mounted to rotate upon the ends of a straight axle 9", which may, however, be of angular form and is entirely free from the frame, being only connected therewith by the engagement of the opposed springs 12" and 13" therewith.

In Figure 5, another embodiment is shown in which the axle $9^a$ of the circular rails 4 has connected to it two rods 16 which pass through bearings 17 upon the frame 1. Two collars 18 and 19 are adjustably mounted upon each of the said rods and springs $12^a$ and $13^a$ are arranged on the rods and bear against the bearings and against the said collars as shown.

The axle of the driving wheels and the axle 7' of the circular rails may be connected as shown in Figure 6 by means of a link 20 which allows for the longitudinal movements of the circular rails and compensates for variations in the distance between the axles.

The same result may be accomplished by means of the annular disc 21 fixed to the axle of the circular rails, thereby avoiding probable separation of the driving wheels from the inner surface of the circular rails.

It is obvious that many constructional and other changes may be introduced without departing from the scope of my present invention which has been clearly set forth in the appended claims.

Having now fully described and ascertained the nature of my invention and in what manner the same is to be carried into practice, I declare that what I claim is:

1. A motor vehicle comprising a frame; a driving wheel mounted in said frame for upward yielding movement; a circular rail, said wheel being adapted to contact on the inside of and drive said rail; a bushing for mounting and guiding said rail for forward end backward movement on said frame; and means in said bushing for permitting longitudinal-tensioned movement of the rail relative to the frame.

2. A motor vehicle comprising a frame; a driving wheel mounted in said frame; a circular rail, said wheel being adapted to contact on the inside of and drive said rail; a bushing for mounting and guiding said rail on said frame, means mounting the bushing for up and down rocking movement on the frame; and a pair of springs in said bushing for permitting longitudinal-tensioned movement of the rail relative to the frame.

3. A motor vehicle comprising a frame; a driving wheel mounted in said frame for upward yielding movement; a circular rail, said wheel being adapted to contact on the inside of and drive said rail; and direct means on the frame and connected with the rail for guiding and permitting longitudinal-tensioned movement of said rail forwardly, backwardly, upwardly and downwardly relative to the frame.

In testimony whereof I affix my signature.

JUAN CARLOS MOLINA MASSEY.